(12) United States Patent
Rotithor et al.

(10) Patent No.: US 7,167,947 B2
(45) Date of Patent: Jan. 23, 2007

(54) MEMORY POST-WRITE PAGE CLOSING APPARATUS AND METHOD

(75) Inventors: Hemant G. Rotithor, Hillsboro, OR (US); Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 474 days.

(21) Appl. No.: 10/801,201

(22) Filed: Mar. 15, 2004

(65) Prior Publication Data
US 2005/0204093 A1    Sep. 15, 2005

(51) Int. Cl.
*G06F 12/00* (2006.01)
(52) U.S. Cl. .................. 711/105; 711/158; 711/167
(58) Field of Classification Search ............. 711/105, 711/158, 167, 100, 154

See application file for complete search history.

(56) References Cited

U.S. PATENT DOCUMENTS

| | | | |
|---|---|---|---|
| 6,591,349 B1 * | 7/2003 | Steinman et al. | 711/154 |
| 2003/0110350 A1 * | 6/2003 | McGee et al. | 711/108 |

* cited by examiner

*Primary Examiner*—Kimberly McLean-Mayo
(74) *Attorney, Agent, or Firm*—Blakely, Sokoloff, Taylor & Zafman LLP

(57) ABSTRACT

Apparatus and method to select write transactions and to selectively mark a write transaction with a page closing hint to cause the page in a memory device to which the write transaction is directed to be closed immediately after the write transaction is carried out if no other write transaction is found in a buffer of pending write transactions that is directed to the same rank, bank and page to minimize incidents of incurring lengthy page miss delays.

16 Claims, 10 Drawing Sheets

MEMORY POST-WRITE PAGE CLOSING APPARATUS AND METHOD

BACKGROUND

Dynamic random access memory (DRAM) devices provide the benefits of higher storage densities and less power consumption in comparison to other memory technologies, including and most notably, static random access memory (SRAM) devices. However, these benefits come at the cost of incurring various delays in accessing the memory cells making up a DRAM device, both at regular intervals, and in the time periods immediately before and after each access to either read data from the memory cells or to write data to the memory cells. The effect of these various delays has been to slow down the effective rate at which data stored within DRAM devices may be accessed, and although various ways have been devised in the prior art to mitigate the effect of these delays such that it is sometimes possible to entirely counteract certain delays in certain situations, the effect of these delays continues to be felt to a significant degree.

Common DRAM devices are made up of many memory cells organized into multiple banks of memory cells, with the memory cells inside of each bank being organized into an array of rows and columns. For data to be written to or read from one or more memory cells within a given row of a given bank, requires that the given row (also commonly referred to as a "page") within the given bank be "opened" for access with a row activate command and a delay be incurred to allow the row activation to complete before the actual reading or writing of data can take place. Unfortunately, only one row of any bank may be open at a time, and if a row other than the given row is already open in the given bank, then that other row must be "closed" with a precharge command and a delay be incurred to allow the precharge to complete before the row activate command to open the given row can be transmitted.

The delay incurred to allow a precharge to finish closing one row before another can be opened in the same bank is a significant delay, and various schemes have been devised to attempt to counteract this delay.

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

Embodiments of the present invention concern incorporating support for marking write transactions with a page closing hint to cause a given write transaction to a given page to be immediately followed with a precharge to close the given page. Although the following discussion centers on DRAM devices in which memory cells are organized into one or more two dimensional arrays of rows and columns, it will be understood by those skilled in the art that the EMBODIMENTS OF THE invention as hereinafter claimed may be practiced in support of a number of different types of memory devices having memory cells organized in a number of different possible ways, including interleaved banks, arrays of more than two dimensions (i.e., more than two-part addresses), content-addressable, etc. Also, although at least part of the following discussion centers on memory devices within computer systems, it will be understood by those skilled in the art that the EMBODIMENTS OF THE invention as hereinafter claimed may be practiced in connection with other electronic devices having memory devices.

Figure 1:
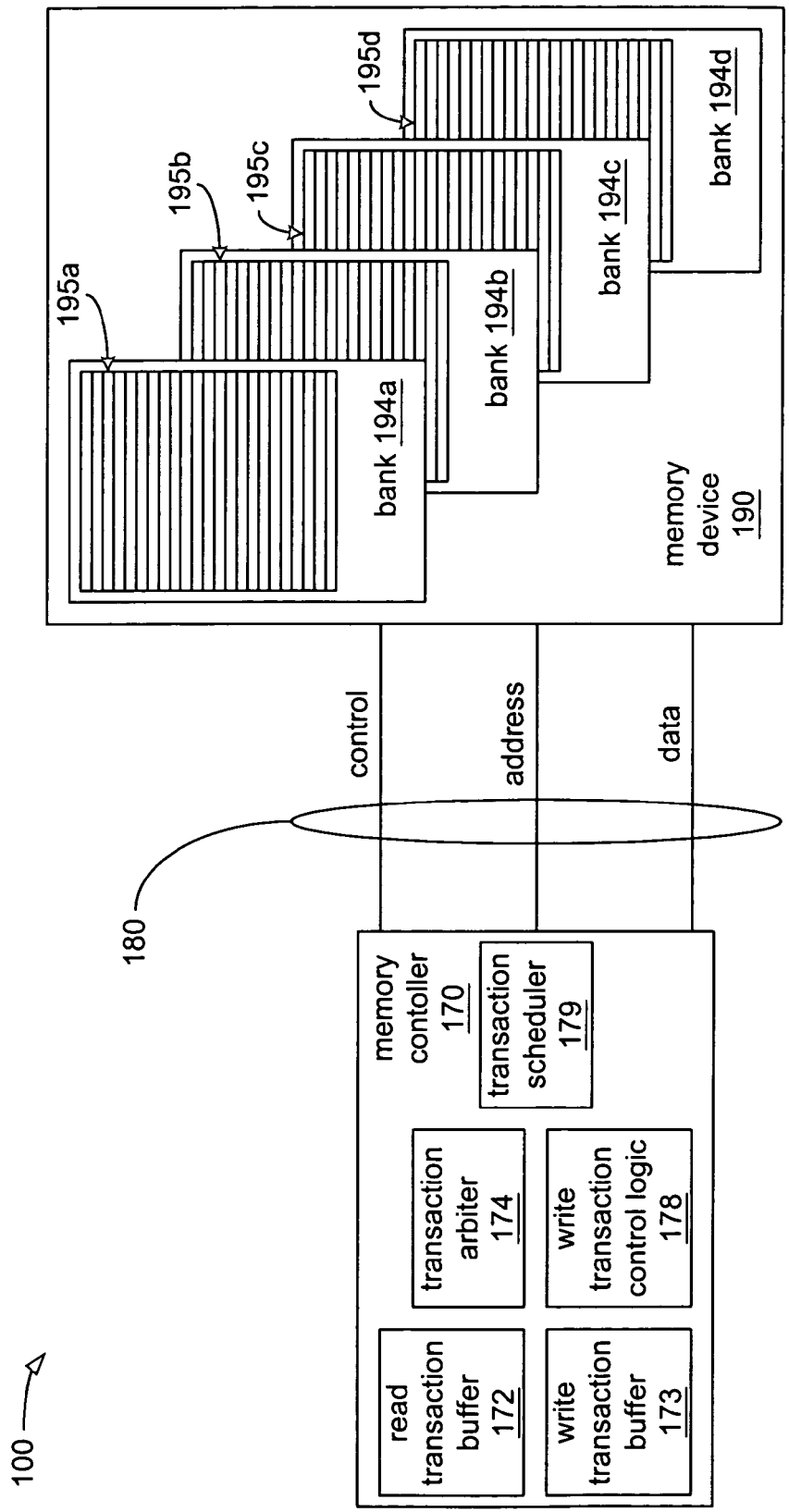
FIG. 1 is a block diagram of an embodiment employing a memory system having a memory controller.

FIG. 1 is a simplified block diagram of an embodiment employing a memory system. Memory system 100 is made up, at least in part, of memory controller 170 and memory device 190 coupled together via memory bus 180. Those skilled in the art of the design of memory systems will readily recognize that FIG. 1 depicts one form of a relatively simple memory system, and that alternate embodiments are possible in which the exact arrangement and configuration of components may be reduced, augmented or otherwise altered without departing from the spirit and scope of the present invention as hereinafter claimed. For example, although memory system 100 is depicted as having only one memory bus 180 and only one memory device 190 for the sake of simplicity in the discussion that follows, it will be readily understood by those skilled in the art that other possible embodiments of memory system 100 may be made up of multiple memory buses and/or devices.

Memory controller 170 controls the functions carried out by memory device 190 as part of providing access to memory device 190 to external devices (not shown) coupled to memory controller 170. Specifically, an external device coupled to memory controller 170 issues commands to memory controller 170 to store data within memory device 190, and to retrieve stored data from memory device 190. Memory controller 170 receives these commands and relays them to memory device 190 in a format having timing and protocols compatible with memory bus 180. In effect, memory controller 170 coordinates accesses made to memory cells within memory device 190 in answer to read and write commands from external devices. In support of these functions in various embodiments, memory controller 170 also coordinates various maintenance operations that must be performed to ensure that data stored within memory device 190 is preserved, including the initiation of regular refresh operations and the occurrence of precharge operations as needed between accesses.

Memory bus 180 is made up of various control, address and data signal lines coupling together memory controller 170 and memory device 190. The exact quantity and characteristics of the various signal lines making up various possible embodiments of memory bus 180 may be configured to be interoperable with any of a number of possible memory interfaces, including those meant to be compatible with known types of memory devices, among them being DRAM (dynamic random access memory) devices such as FPM (fast page mode) memory devices, EDO (extended data out), dual-port VRAM (video random access memory), window RAM, SDR (single data rate), DDR (double data rate), RAMBUS™ DRAM, etc. In some embodiments, where activity on various signal lines is meant to be coordinated with a clock signal, one or more of the signal lines, perhaps the control signal lines, serves to transmit a clock signal between memory controller 170 and memory device 190. In some embodiments, one or more control signals and address signals may be multiplexed onto common signal lines such that control signals and address signals are transmitted at different times on common conductors for carrying signals between memory controller 170 and memory device 190. Also, in some embodiments, one or more address signals and data signals may be multiplexed onto common signal lines.

Memory device 190 is a DRAM memory device configured to be interoperable with memory bus 180. In some embodiments, memory device 190 is a single integrated circuit. In other embodiments, memory device 190 is made up of multiple integrated circuits of a removable memory module, such as a SIMM (single inline memory module), SIPP (single inline pin package), DIMM (dual inline memory module), etc. The memory cells of memory device 190 are grouped into multiple banks, such as banks 194a–d, with the memory cells of each bank being subdivided into pages 195a–d (also commonly referred to as "rows"), respectively. Memory device 190 receives commands and addresses from memory controller 170 through memory bus 180, and carries out those commands, accessing one or more specific ones of pages 195a–d of one or more corresponding ones of banks 194a–d. Although memory device 190 is depicted as having only one rank of banks (namely banks 194a–d), it will be understood by those skilled in the art that memory device 190 may be made up of multiple ranks selectable via chip select signals in a manner akin to there being multiple memory devices, or selectable via other signaling techniques or protocols.

In some embodiments, memory controller 170 is made up of read transaction buffer 172, write transaction buffer 173, transaction arbiter 174, write transaction control logic 178 and transaction scheduler 179. As memory controller 170 receives requests to either read data from memory device 190 or to write data to memory device 190, requests for read and write transactions are separately stored in read transaction buffer 172 and write transaction buffer 173, respectively (although requests for read and write transactions may be stored in a combined buffer in alternate embodiments). Transaction arbiter 174 monitors read transaction buffer 172 and write transaction buffer 173 to determine whether a pending read transaction or a pending write transaction should next be executed, with any of a number of possible algorithms being employed to make such a determination. In some embodiments, various factors may lead to the choice of an algorithm in which read transactions are always given priority over write transactions and/or an algorithm for determining which write transactions are accompanied with a page closing hint without taking into account either characteristics or status of pending read transactions. Such factors may include the disjunctular nature of pending read and write transactions in various electronic systems such that a read transaction pending at any given time may not be likely to overlap the same address or even the same page of a bank as a write transaction pending at the same time, the possible high sensitivity of the performance of read transactions to the latency of awaiting the return of read data, and the simple fact that pending write transactions are being stored in a buffer, such as write transaction buffer 173.

Regardless of the algorithm employed by transaction arbiter 174, in some embodiments, when transaction arbiter 174 chooses to allow a write transaction to be carried out, memory controller 170 engages in a multi-step process to select a write transaction from among pending write transactions stored in write transaction buffer 173 in a manner intended to minimize back-to-back write page misses, and write transaction control logic 178 marks certain write transactions that are selected and passed on to transaction scheduler 179 with a page closing hint signal to attempt to minimize occurrences of pages being left open such that a write page miss occurs. These approaches to minimizing back-to-back write page misses and marking certain write pages with page closing hints will be discussed in greater detail, below. The marking of given write transactions selected from write transaction buffer 173 may, in some embodiments, result in a write command with auto precharge being transmitted by transaction scheduler to memory device 190 so that the page to which the write command is directed is closed immediately after being written, as opposed to transmitting a write command that does not embed an auto precharge command.

Figure 2:
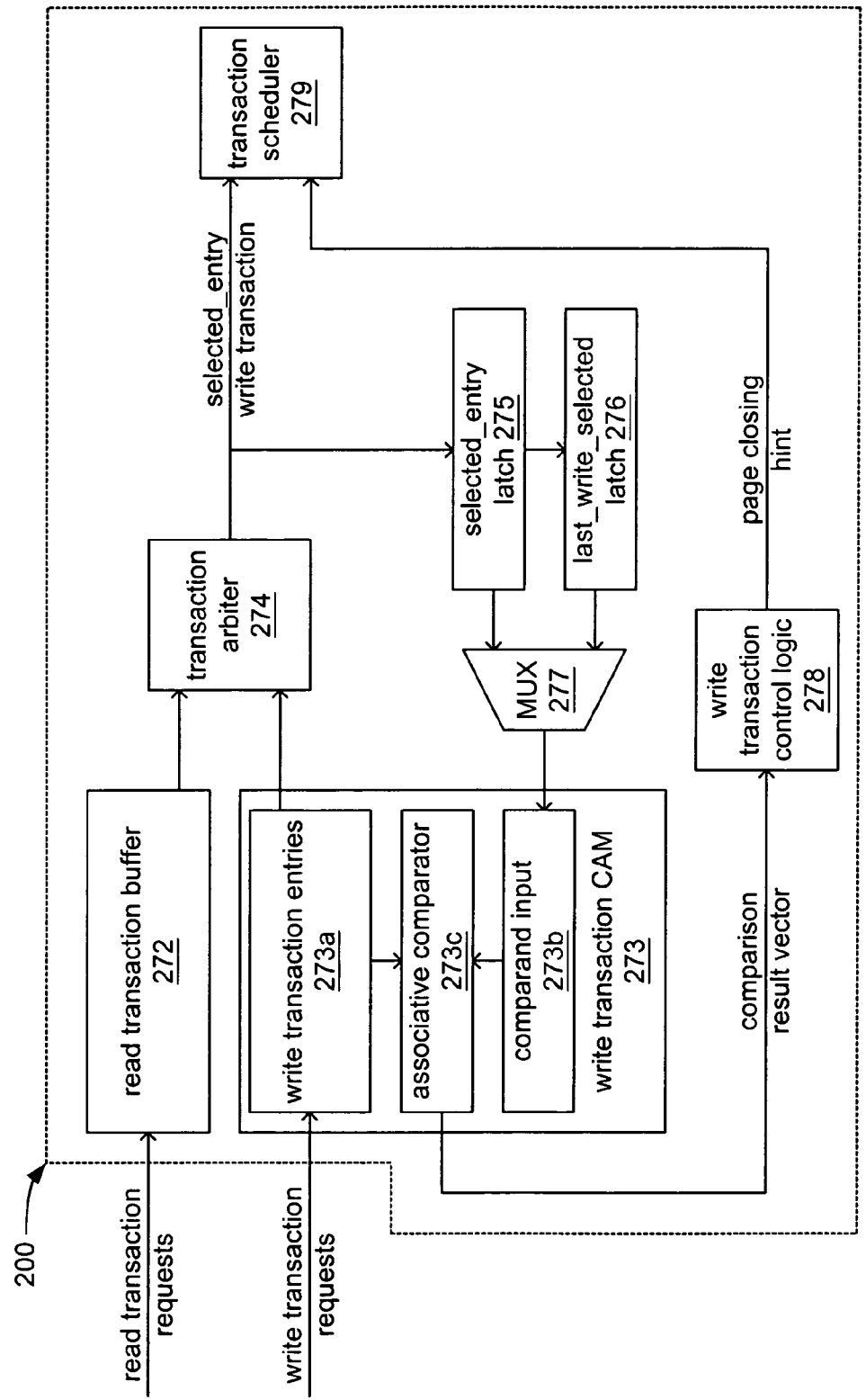
FIG. 2 is a block diagram of an embodiment employing memory control circuitry.
Figure 3A:
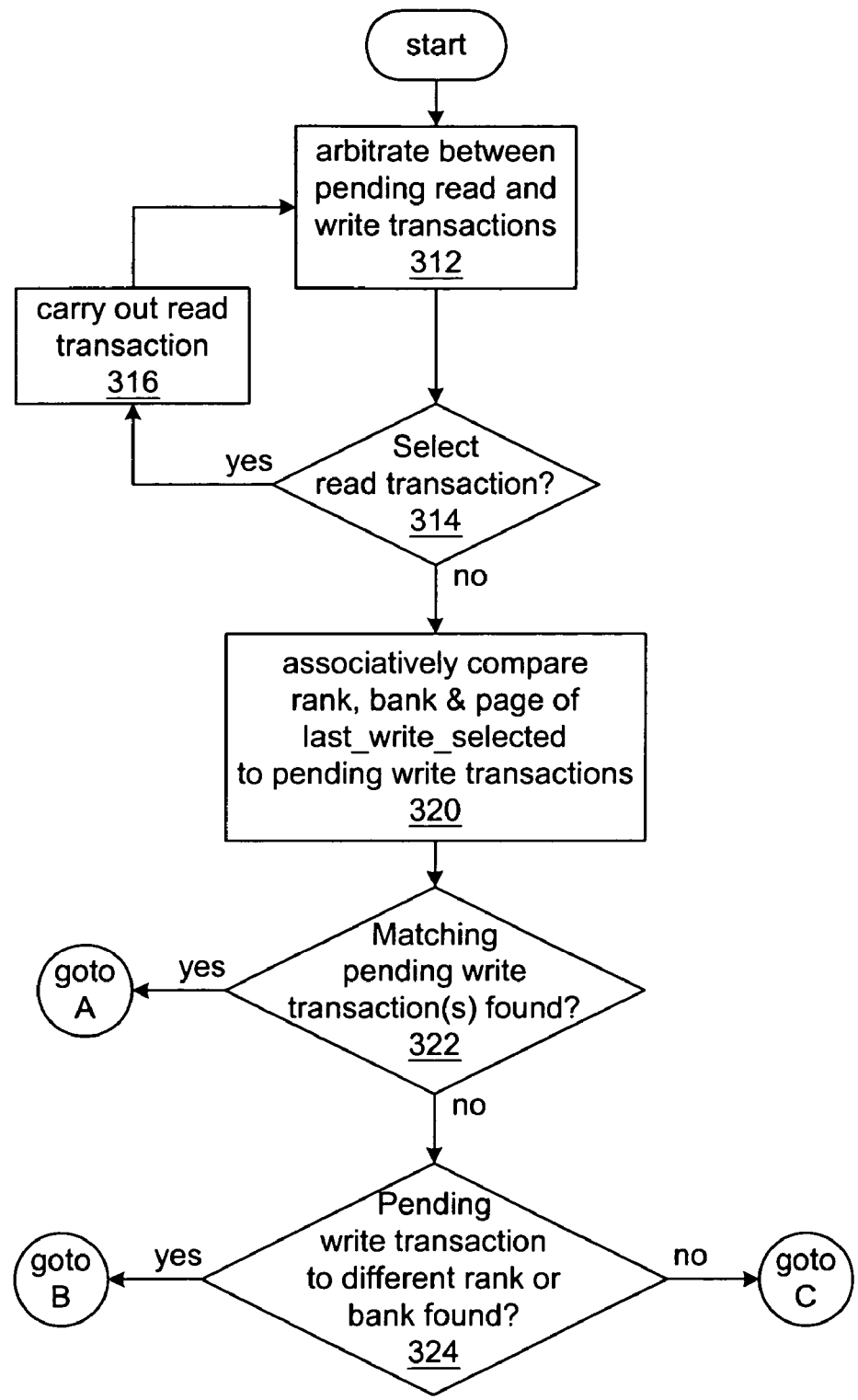
FIGS. 3a, 3b, 3c and 3d, together, are a flow chart of an embodiment.
Figure 3B:
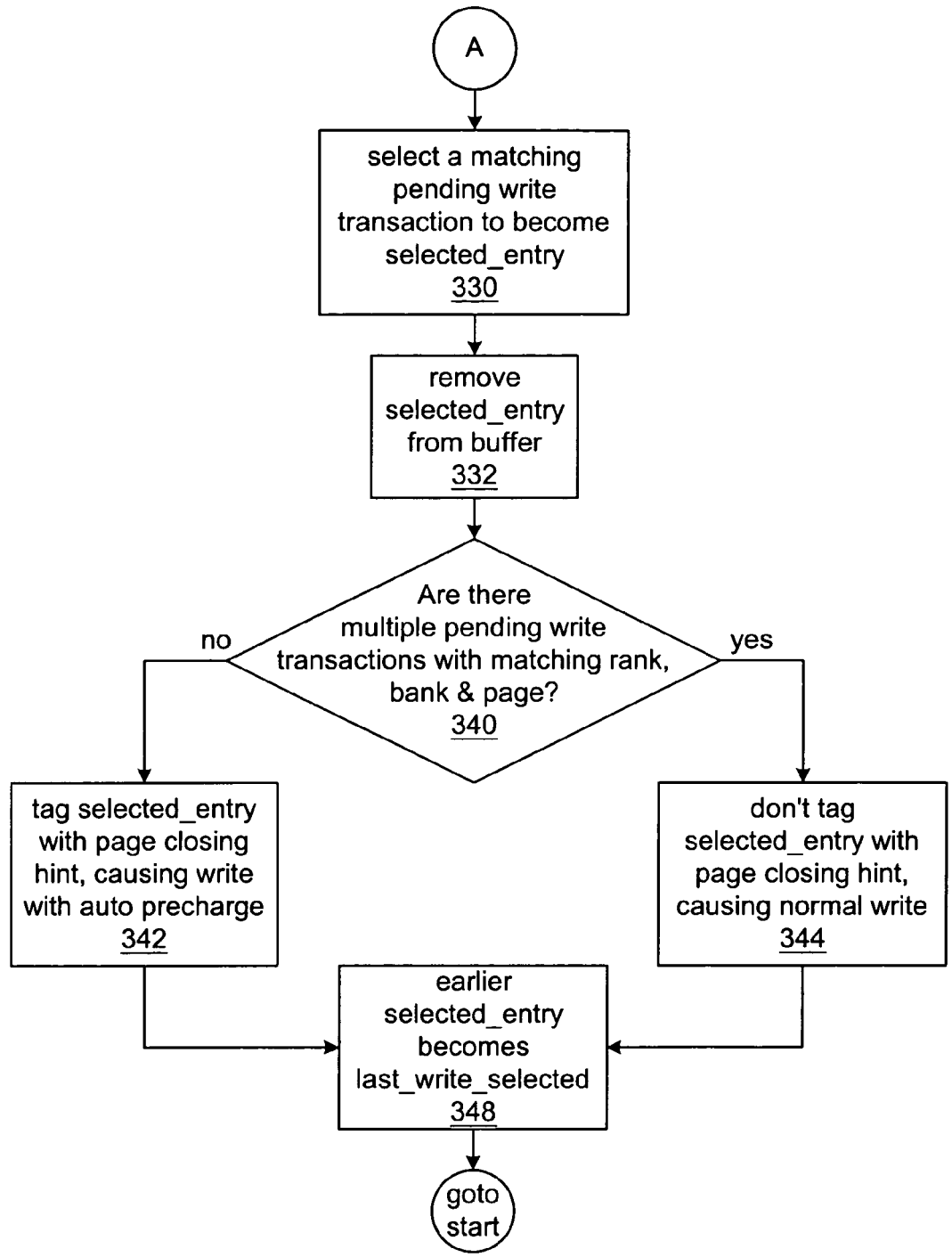
Figure 3C:
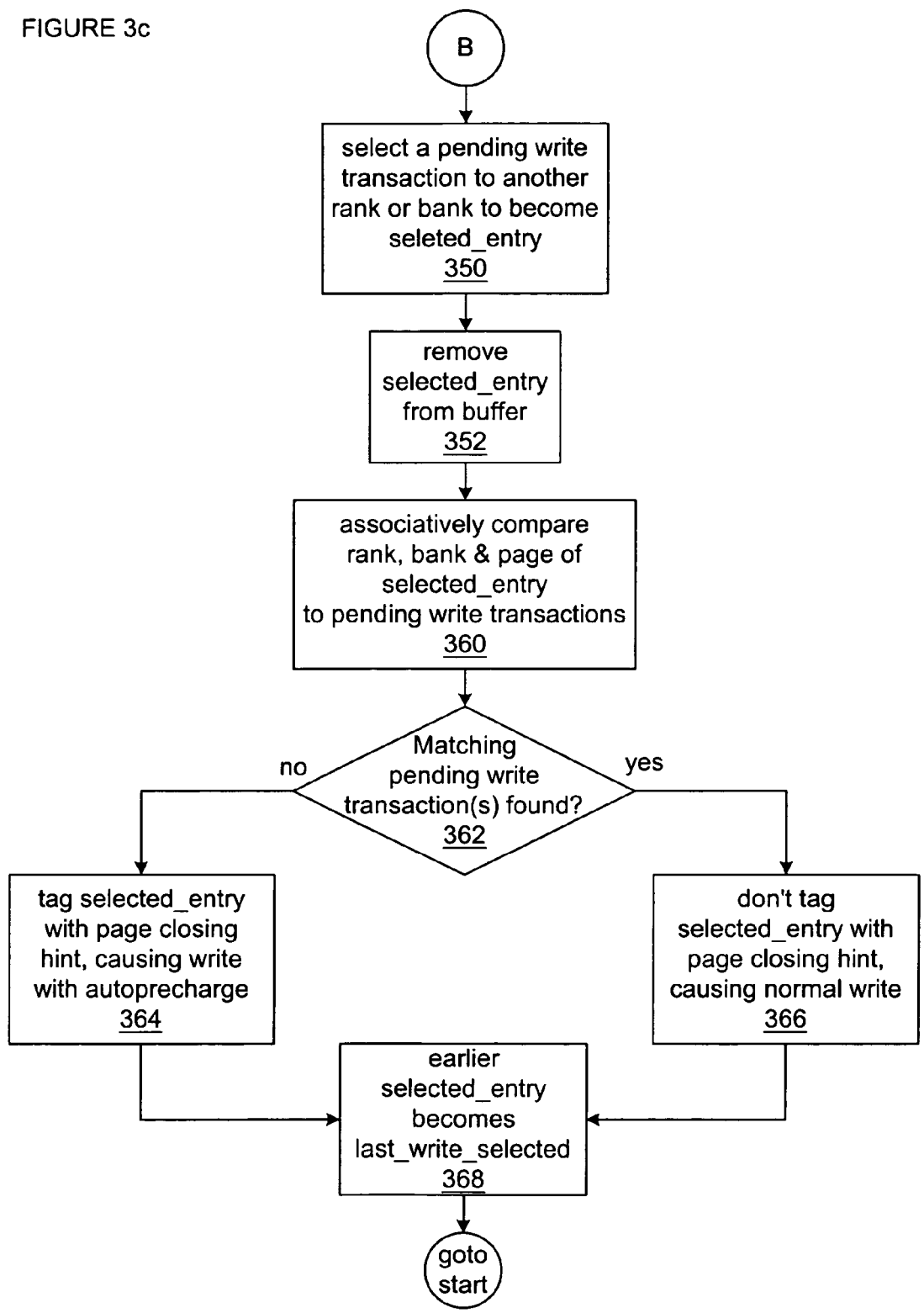
Figure 3D:
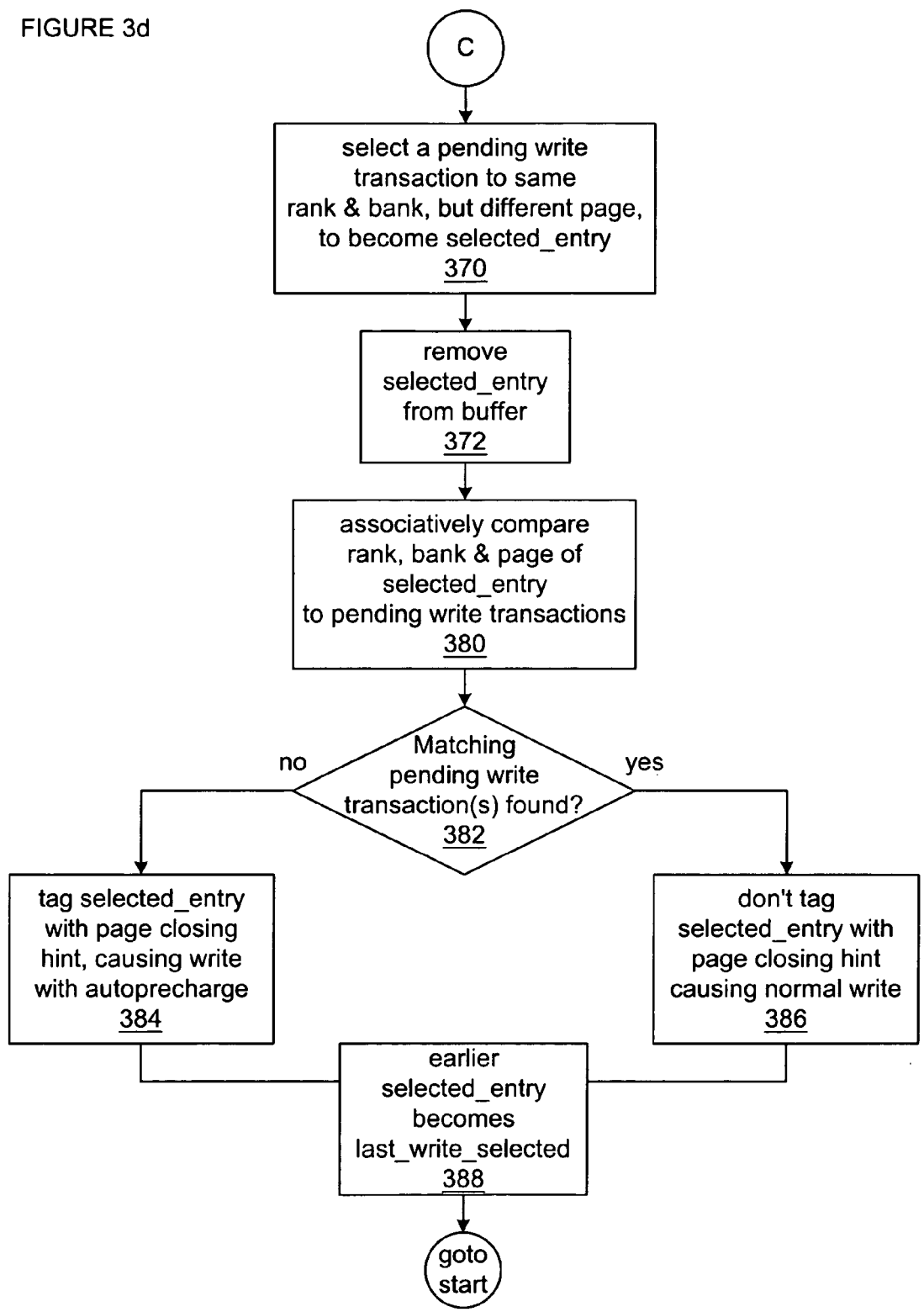

FIG. 2 is a simplified block diagram of an embodiment employing memory control circuitry. Memory control circuitry 200 is made up, at least in part, of read transaction buffer 272, write transaction CAM (content-addressable memory) 273, transaction arbiter 274, selected_entry latch 275, last_write_selected latch 276, multiplexer 277, write transaction control logic 278 and transaction scheduler 279. Memory control circuitry 200 may be a portion of a memory controller that controls the functions carried out by a memory device (not shown) as part of providing access to that memory device to other external devices (also not shown) coupled to the memory controller. In other words, an external device coupled to a memory controller of which memory control circuitry 200 may be a part, issues commands to the memory controller to store data within a memory device, and to retrieve stored data from a memory device and such a memory controller receives and relays these commands to the memory device in a format having timing and protocols compatible with that memory device.

Requests for read and write transactions are received from outside memory control circuitry 200 (whether from a device external to a memory controller of which memory control circuitry 200 is a part, or from other forms of circuitry), with requests for read transactions being stored as pending read transactions within read transaction buffer 272, and requests for write transactions being stored as pending write transactions within write transaction entries 273a of write transaction CAM 273. Transaction arbiter 274 determines whether a pending read transaction within read transaction buffer 272 or a pending write transaction within write transaction entries 273a of write transaction CAM 273 should be the next transaction to be carried out. While transaction arbiter 274 may employ any of a number of algorithms to make this determination, in some embodiments, transaction arbiter 274 simply gives any read transaction priority over any write transaction. If transaction arbiter 274 determines that a write transaction should be carried out, the actual selection of which write transaction is to be carried out may be made using a multiple part algorithm.

The address to which a pending write transaction is directed is copied to selected_entry latch 275 when that pending write transaction is selected, thereby becoming the selected_entry write transaction that is removed from write transaction entries 273a and sent to transaction scheduler 279 to be carried out. This same address is later copied to last_write_selected latch 276 to preserve that address before the next select_entry write transaction is selected and the address to which the next select_entry write transaction is directed is then copied into selected_entry latch 275. Multiplexer 277 is employed to select between the address stored within selected_entry latch 275 and the address stored within last_write_selected latch 276 to be latched and employed by comparand input 273b in one or more associative comparisons performed by associative comparator 273c between comparand input 273b and the addresses of pending write transactions stored within write transaction entries 273a, as will shortly be described in more detail. A bit vector indicating which of write transaction entries 273a, if any, are storing a pending write transaction that are a match to the comparand is generated by associative comparator 273c and transferred to write transaction control logic 278. Write transaction control logic 278, as a result of some of the associative comparisons that are carried out, may transmit a page closing hint signal to transaction scheduler 279 indicating that the page corresponding to the address to which a given selected_entry write transaction is directed should be closed immediately after the selected_entry write transaction is carried out. In some embodiments, this may entail transaction scheduler 279 either transmitting or causing to be transmitted a write command to a memory device to carry out the selected_entry write transaction with an auto precharge command embedded within that write command.

Describing the operation of memory control circuitry 200 more specifically, the address of the selected_entry write transaction (i.e., the address to which the currently selected write transaction is directed) is copied from selected_entry latch 275 to last_write_selected latch 276 to become the address to which the previously selected write transaction was directed, thereby preserving the address of what was the selected_entry write transaction. Transaction arbiter 274 makes its determination as to whether or not the next transaction is to be a read transaction or a write transaction, employing whatever algorithm. When transaction arbiter 274 does make the determination that a write transaction will be selected, a first associative comparison is made by associative comparator 273c between the rank, bank and page of the address of the last_write_selected write transaction copied into last_write_selected latch 276 and the rank, bank and page of all of the addresses of the pending write transactions stored in write transaction entries 273a. A first comparison result vector indicating the results of this first associative comparison is provided by associative comparator 273c to write transaction control logic 278, although in various alternative embodiments, the results may be signaled in other ways than by such a bit vector.

If the first comparison result vector indicates that there is a pending write transactions in write transaction entries 273a that has a rank, bank and page matching the rank, bank and page of the last_write_selected write transaction, then in response to the possibility that the page to which the last_write_selected write transaction was directed may still open, this pending write transaction is selected to become the new selected_entry write transaction. Also, if the first comparison result vector indicates that this new selected_entry write transaction is the only pending write transaction found to be directed to the same rank, bank and page as the last_write_selected write transaction, then the new selected_entry write transaction is removed from write transaction entries 273a and is sent to transaction scheduler 279 with an accompanying page closing hint from write transaction control logic 278 signaling to transaction scheduler 279 that the page to which the selected_entry write transaction is directed should be closed immediately after the selected_entry write transaction is carried out. However, if the first comparison result vector indicates that the new selected_entry write transaction is one of multiple pending write transactions directed to the same rank, bank and page as the last_write_selected write transaction, then the new selected_entry write transaction is sent to transaction scheduler 279 without an accompanying page closing hint signal from write transaction control logic 278. Either way, as a the new selected_entry write transaction is sent to transaction scheduler 279, a copy of the address to which the new selected_entry write transaction is directed is latched within selected_entry latch 275 for future use.

If the first comparison result vector indicates that there are no pending write transactions that have a rank, bank and page matching the rank, bank and page of the last_write_selected write transaction, but that there is a pending write transaction to a different rank or bank, then in response to the opportunity to avoid incurring the lengthy delay of a page miss from writing to a different page in the same rank and bank to which the last_write_selected write transaction was directed, this pending write transaction is selected to become the new selected_entry write transaction. The new selected_entry write transaction is removed from write transaction entries 273a and is sent to transaction scheduler 279 while a copy of the address to which the new selected entry is directed is latched within selected_entry latch 275. A second associative comparison is then made by associative comparator 273c, but this time, between the rank, bank and page of the address of the selected_entry write transaction (using the address stored within selected_entry latch 275) and the rank, bank and page of all of the addresses of the pending write transactions stored in write transaction entries 273a. A second comparison result vector indicating the results of this second associative comparison is provided by associative comparator 273c to write transaction control logic 278, although again, in various alternative embodiments, the results may be signaled in other ways than by such a bit vector. If the second comparison result vector indicates that there are no pending write transactions still in write transaction entries 273a that have a rank, bank and page matching the rank, bank and page of the selected_entry write transaction, then a page closing hint is provided by page closing hint logic 278 to transaction scheduler 279 to accompany the selected_entry write transaction to signal transaction scheduler 279 that the page to which the selected_entry write transaction is directed should be closed immediately after the selected_entry write transaction is carried out. However, if the second comparison result vector indicates that there is another pending transaction still in write transaction entries 273a that is directed to the same rank, bank and page as the selected_entry write transaction, then no such page closing hint is sent to transaction scheduler 279.

If the first comparison result vector indicates that there are no pending write transactions that have a rank, bank and page matching the rank, bank and page of the last_write_selected write transaction; and there are no pending write transactions to a different rank or bank than the last_write_selected write transaction; but there is a pending write transaction to the same rank and bank as the last_write_selected write transaction, though to a different page; then although this may mean incurring the lengthy delay of a page miss from writing to a different page in the same rank and bank to which the last_write_selected write transaction was directed, this pending write transaction is selected as a last resort to become the new selected_entry write transaction. The new selected_entry write transaction is removed from write transaction entries 273*a* and is sent to transaction scheduler 279 while a copy of the address to which the new selected entry is directed is latched within selected_entry latch 275. A second associative comparison is then made by associative comparator 273*c* between the rank, bank and page of the address of the selected_entry write transaction (using the address stored within selected_entry latch 275) and the rank, bank and page of all of the addresses of the pending write transactions stored in write transaction entries 273*a*. If the second comparison result vector indicates that there are no pending write transactions still in write transaction entries 273*a* that have a rank, bank and page matching the rank, bank and page of the selected_entry write transaction, then a page closing hint is provided by page closing hint logic 278 to transaction scheduler 279 to accompany the selected_entry write transaction and signal transaction scheduler 279 that the page to which the selected_entry write transaction is directed should be closed immediately after the selected_entry write transaction is carried out. However, if the second comparison result vector indicates that there is another pending transaction still in write transaction entries 273*a* that is directed to the same rank, bank and page as the selected_entry write transaction, then no such page closing hint is sent to transaction scheduler 279.

FIG. 3 is a flow chart of embodiments. At 312, arbitration logic arbitrates between any pending read transactions stored in a read transaction buffer and any pending write transactions stored in the write transaction buffer to select the next transaction. In some embodiments, such arbitration logic follows an algorithm of prioritizing a pending read transaction over a pending write transaction, and so at 314, if there is a pending read transaction is to be selected (perhaps over a pending write transaction), then that pending read transaction is carried out at 316, followed by further arbitration at 312. However, in other embodiments, other algorithms may be employed for selecting between pending read and write transactions. If there are no pending read transactions at 314, then at 320, an associative comparison is made between the rank, bank and page of the address to which the last_write_selected write transaction was directed and addresses to which all of the pending write transactions stored in the write transaction buffer are directed.

At 322, if there are any pending write transactions in the write transaction buffer having a rank, bank and page that match the rank, bank and page of the last_write_selected write transaction, then it is possible that the page to which the last_write_selected write transaction was directed is still open, thereby providing an opportunity for another write transaction to be directed to the same page with minimal delay, unless the last_write_selected write transaction was followed by a different transaction (such as a read, refresh, etc.) which caused that page to be closed. At 330, one of those pending write transactions with matching rank, bank and page (if there is more than one from which to select) is selected to become the new selected_entry write transaction using any of a number of possible algorithms to make that selection, as those skilled in the art will recognize. At 332, this new selected_entry write transaction is removed from the write transaction buffer to be sent onward to other logic to be carried out, while the address of the selected_entry write transaction is latched for future use. At 340, if the selected_entry write transaction was the only pending write transaction to the same rank, bank and page from which to select the new last_write_selected write transaction, then it is known that there are currently no other pending write transactions in the write transaction buffer to the same rank, bank and page as the selected_entry write transaction, and so at 342, the selected_entry write transaction is sent onward to other logic to be carried out with a page closing hint signaling to the other logic that the page to which the selected_entry write transaction is directed should be closed immediately after the selected_entry write transaction is carried out to avoid a subsequent write transaction that might be to the same bank (but presumably, not the same page) having to incur the lengthy delay resulting from a page miss. In some embodiments, this page closing hint would result in the other logic transmitting a write command with auto precharge for the selected_entry write transaction. However, at 340, if the selected_entry was one of multiple matches from which a selection was made, then it is known that there are still other pending write transactions in the write transaction buffer to the same rank, bank and page as the selected_entry, and so at 344, the selected_entry write transaction is sent onward to other logic to be carried out without a page closing hint so that the page to which the selected_entry is directed may remain open for what is presumed will be a subsequent write transaction to the same rank, bank and page selected from among the pending write transactions stored in the write transaction buffer. Regardless of whether a page closing hint accompanies the selected_entry, at 348, the address of the selected_entry write transaction is copied to a latch for storing the address of the last_write_selected write transaction, thereby preserving the address of what was the selected_entry write transaction in preparation for the selection of another pending write transaction from those stored in a write transaction buffer to become the new selected_entry write transaction, before proceeding back to 312.

However, at 322, if there are no pending write transactions in the write transaction buffer having a rank, bank and page that match the rank, bank and page of the last_write_selected write transaction, then it is known that whatever pending write transaction is about to be selected as the selected_entry write transaction will not be to the same rank, bank and page as the last_write_selected write transaction. The results of the associative comparison made at 320 are further examined at 324 to determine if there is a pending write transaction to a different rank or bank within the write transaction buffer. It should be noted that the associative comparison at 320 may, in some embodiments, be a parallel pair of associative comparisons in which rank, bank and page are compared in one of the parallel associative comparisons, while only rank and bank are compared in the other associative comparison. In such embodiments, the results from the parallel associative comparison that included comparing pages is used at 322, while the results from the parallel associative comparison not including the comparison of pages is used at 324, if needed (since depending on what occurs at 322, 324 may be skipped). Alternatively, in other embodiments, the associative comparison at 320 may be made up of a primary associative comparison of rank, bank and page in preparation for 322, immediately followed by a secondary associative comparison of only rank and bank in preparation for 324, if needed. As those skilled in the art will appreciate, still other variations of this form of dual associative comparison or single comparison employing an algorithm that provides dual results are possible without departing from the spirit and scope of the claimed invention.

At 324, if there are any pending write transactions in the write transaction buffer directed to a different rank and/or bank than the rank and bank of the last_write_selected write transaction, then it is possible to avoid incurring the delay that may be incurred from waiting for the completion of the closing of the page to which the last_write_selected write transaction was directed by selecting a pending write transaction from the write transaction buffer that is directed to a different rank and/or bank. At 350, one of those pending write transactions to a different rank and/or bank (if there is more than one from which to select) is selected to become the new selected_entry write transaction using any of a number of possible algorithms to make that selection, as those skilled in the art will recognize. At 352, this new selected_entry write transaction is removed from the write transaction buffer to be sent onward to other logic to be carried out, while the address of the selected_entry write transaction is latched for future use. At 360, an associative comparison is made between the rank, bank and page of the selected_entry address just latched and all of the pending write transactions stored in the write transaction buffer. At 362, if no pending write transactions are found having a matching rank, bank and page, then it is deemed unlikely that there will be a subsequent write transaction directed to the same rank and bank that will also be directed to the same page as the selected_entry write transaction, and so at 364, the selected_entry write transaction is sent onward to the other logic accompanied by a page closing hint signaling to the other logic that the page to which the selected_entry write transaction is directed should be closed immediately after the selected_entry write transaction is carried out to avoid incurring the lengthy delay of a page miss when a subsequent write transaction to the same rank and bank (but presumably, not the same page) is executed. However, at 362, if any pending write transactions are found having a matching rank, bank and page, then it is possible that after the selected_entry write transaction is carried out, the page to which the selected_entry write transaction is directed may remain open such that another write transaction directed to the same page may be selected from the pending write transactions stored in the write transaction buffer and directed to the same page with minimal delay, unless the selected_entry write transaction is followed by a different intervening transaction (such as a read, refresh, etc.) which causes that page to be closed. If any such pending write transaction with matching rank, bank and page is found, then at 366, no page closing hint accompanies the selected_entry transaction to the other logic. Regardless of whether a page closing hint accompanies the selected_entry, at 368, the address of the selected_entry write transaction is copied to a latch for storing the address of the last_write_selected write transaction, thereby preserving the address of what was the selected_entry write transaction in preparation for the selection of another pending write transaction from those stored in a write transaction buffer to become the new selected_entry write transaction, before proceding back to 312.

At 324, if there are no pending write transactions in the write transaction buffer directed to a different rank and/or bank than the rank and bank of the last_write_selected write transaction, then it may not be possible to avoid incurring the delay that may be incurred from waiting for the completion of the closing of the page to which the last_write_selected write transaction was directed as a result of having to select a pending write transaction from the write transaction buffer that is directed to the same rank and bank, but to a different page. At 370, one of those pending write transactions to the same rank and bank, but a different page (if there is more than one from which to select), is selected to become the new selected_entry write transaction using any of a number of possible algorithms to make that selection, as those skilled in the art will recognize. At 372, this new selected_entry write transaction is removed from the write transaction buffer to be sent onward to other logic to be carried out, while the address of the selected_entry write transaction is latched for future use. At 380, an associative comparison is made between the rank, bank and page of the selected_entry address just latched and all of the pending write transactions stored in the write transaction buffer. At 382, if no pending write transactions are found having a matching rank, bank and page, then it is deemed unlikely that there will be a subsequent write transaction directed to the same rank and bank that will also be directed to the same page as the selected_entry write transaction, and so at 384, the selected_entry write transaction is sent onward to the other logic accompanied by a page closing hint signaling to the other logic that the page to which the selected_entry write transaction is directed should be closed immediately after the selected_entry write transaction is carried out to avoid incurring the lengthy delay of a page miss when a subsequent write transaction to the same rank and bank (but presumably, not the same page) is executed. However, at 382, if any pending write transactions are found having a matching rank, bank and page, then it is possible that after the selected_entry write transaction is carried out, the page to which the selected_entry write transaction is directed may remain open such that another write transaction directed to the same page may be selected from the pending write transactions stored in the write transaction buffer and directed to the same page with minimal delay, unless the selected_entry write transaction is followed by a different intervening transaction (such as a read, refresh, etc.) which causes that page to be closed. If any such pending write transaction with matching rank, bank and page is found, then at 386, no page closing hint accompanies the selected_entry transaction to the other logic. Regardless of whether a page closing hint accompanies the selected_entry, at 388, the address of the selected_entry write transaction is copied to a latch for storing the address of the last_write_selected write transaction, thereby preserving the address of what was the selected_entry write transaction in preparation for the selection of another pending write transaction from those stored in a write transaction buffer to become the new selected_entry write transaction, before proceeding back to 312.

Figure 4A:
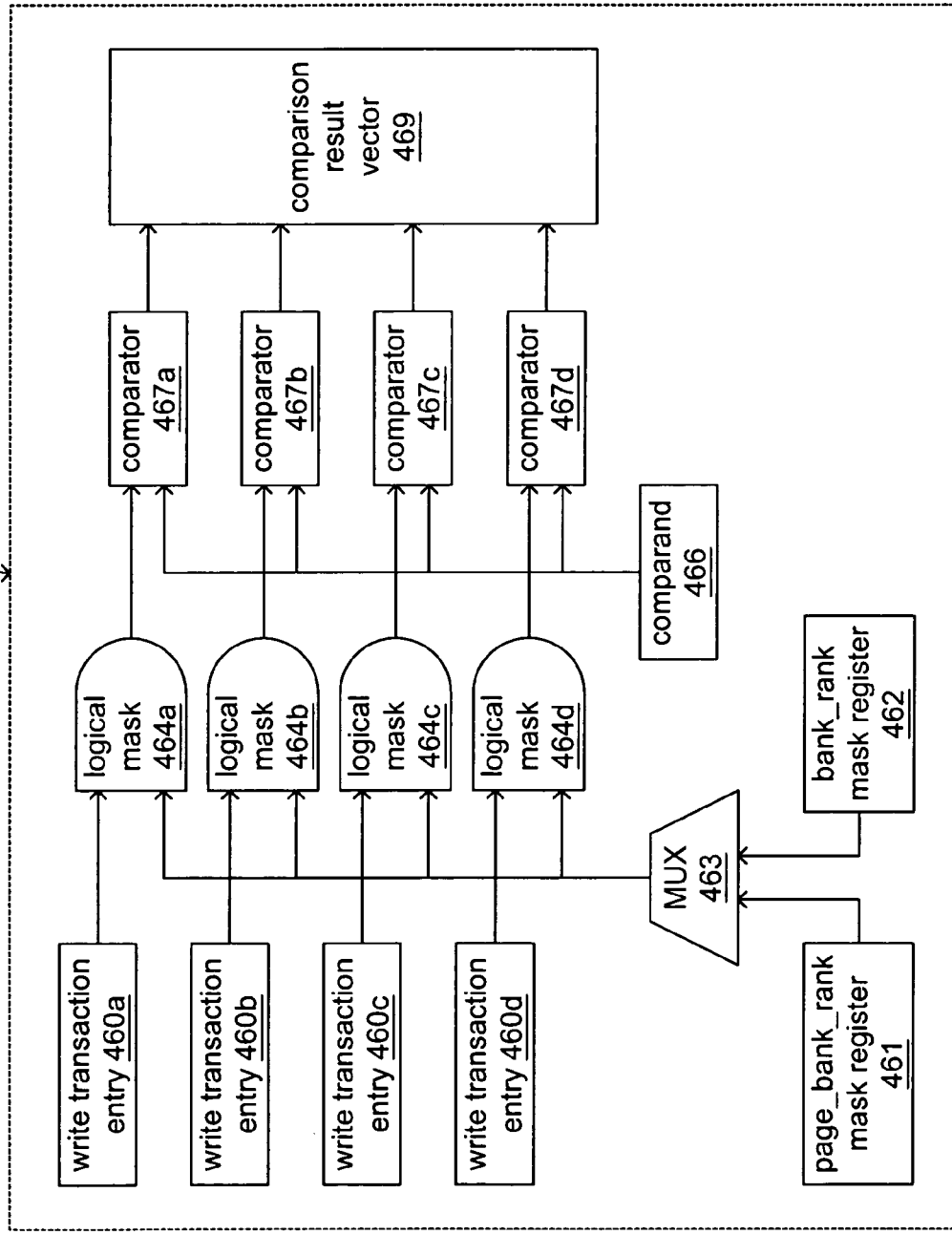
FIGS. 4a and 4b are block diagrams of other embodiments employing a portion of memory control circuitry.
Figure 4B:
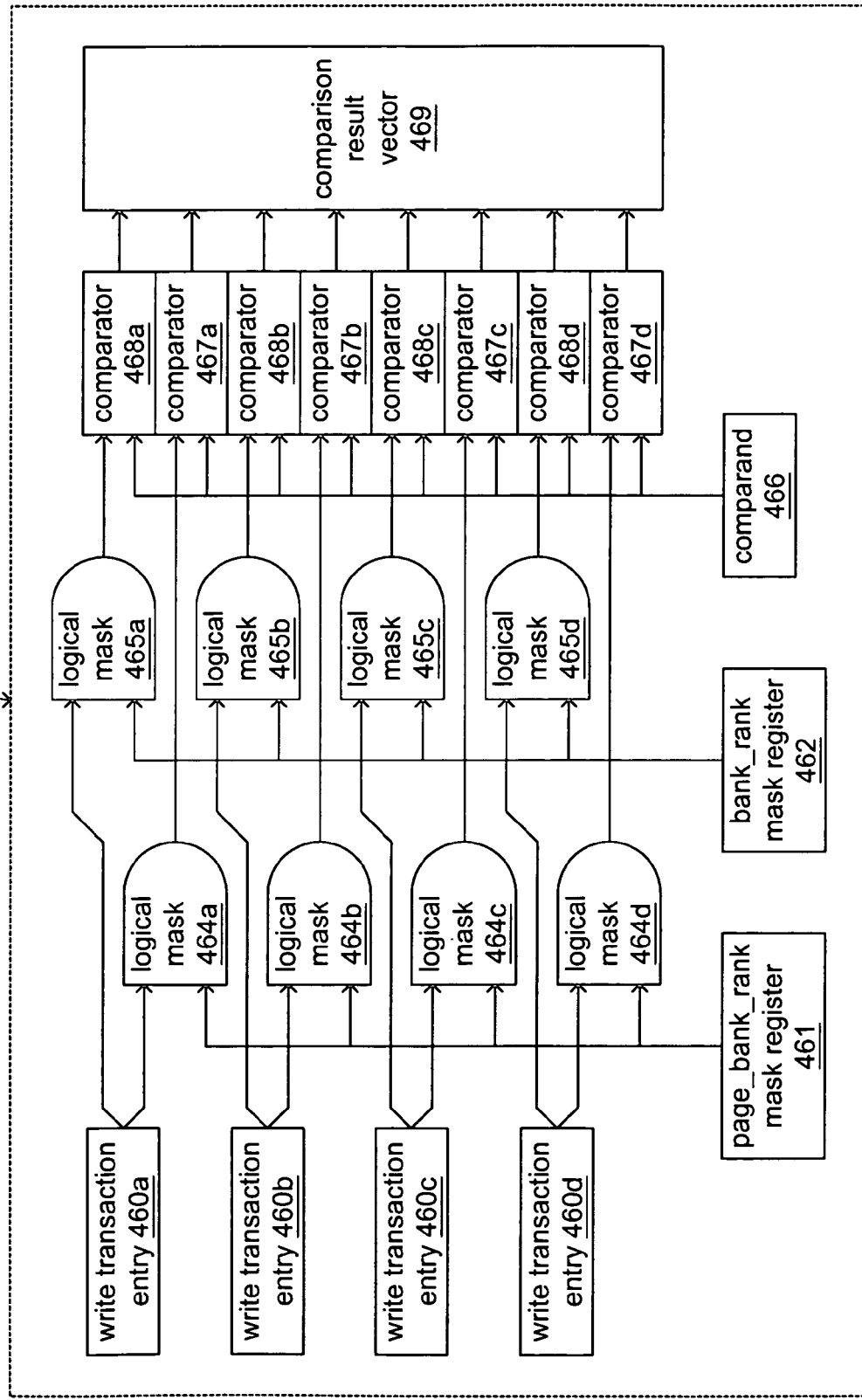

FIGS. 4a and 4b are block diagrams of other embodiments employing memory control circuitry. In various possible embodiments, memory control circuitry 400 of the form depicted in either FIG. 4a or 4b may make up a portion of memory controller 170 of FIG. 1 and/or may make up a subset of memory control circuitry 200 of FIG. 2. Memory control circuitry 400 in both FIGS. 4a and 4b is made up of write transaction entries 460a–d, page_bank_rank mask register 461, and bank_rank mask register 462. In various possible embodiments, memory control circuitry 400 may be deemed to be a portion of a content-addressable memory device.

Both forms of memory control circuitry 400 receive comparand 466, which may be either the address to which a previous write transaction (such as last_write_selected) was directed or the address to which a currently selected write transaction (such as selected_entry) is directed. The exact form of comparand 466 may either be a binary value identifying the starting address of a portion of memory to which a write transaction was/is directed, or may be a concatenation of values that separately specify the memory bus (i.e., channel), rank, bank, row (i.e., page) and/or column of a portion of a memory device to which a write transaction was/is directed. If comparand 466 is in the form of a binary starting address, then in some embodiments, further logic (not shown) may be employed to convert comparand 466 into equivalent values specifying channel, rank, bank, page and/or column for use in carrying out associative comparisons. Alternatively, such associative comparisons may be carried out on bits of a binary starting address form of comparand 466, directly, without such a conversion.

Both forms of memory control circuitry 400 also receive and store at least the addresses to which write transactions were/are directed in write transaction entries 460a–d. As those skilled in the art will readily recognize, the exact quantity of write transaction entries may be changed without departing from the spirit and scope of the claimed invention.

Both forms of memory control circuitry 400 are programmed with masking values in both page_bank_rank mask register 461 and bank_rank mask register 462, and both masking values are determined, at least in part, by the configuration of the memory device(s) with which memory control circuitry 400 is used. The masking value in page_bank_rank mask register 461 is chosen to screen out bits specifying (or at least correlating with) one or more columns of memory cells within a memory device that make up a page. In other words, the masking value in page_bank_rank mask register 461 is chosen to allow only bits specifying (or at least correlating with) the rank, bank and page (perhaps, also the channel) portions of an address to which a write transaction was/is directed. The masking value in bank_rank mask register 462 is chosen to additionally screen out bits specifying (or at least correlating with) one or more columns, such that only bits specifying (or at least correlating with) the rank and bank (perhaps, also the channel) portions of an address to which a write transaction was/is directed. Having both page_bank_rank mask register 461 and bank_rank mask register 462 in both forms of memory control circuitry 400 allows both forms of memory control circuitry 400 to make an associative comparison of rank, bank and page (perhaps also channel), and an associative comparison limited to rank and bank (perhaps also channel).

Where the two forms of memory control circuitry 400 depicted in FIGS. 4a and 4b differ is in whether these two associative comparisons are carried out serially (FIG. 4a) or in parallel (FIG. 4b). In FIG. 4a, the two associative comparisons are carried out serially, with multiplexer 463 selecting the mask value from either page_bank_rank mask register 461 or bank_rank mask register 462, depending on which associative comparison is being made. The chosen mask value becomes one of the two inputs, along with addresses from corresponding ones of write transaction entries 460a–d, to logical masks 464a to carry out the masking of bits that are not desired to become part of the associative comparison. The outputs of logical masks 464a–d, in turn, become inputs to corresponding ones of comparators 467a–d, along with comparand 466, and the outputs of comparators 467a–d form comparison result vector 469. In FIG. 4b, the two associative comparisons are carried out in parallel, with the mask values of page_bank_rank mask register 461 and bank_rank mask register 462 becoming inputs to logical masks 464a–d and 465a–d, respectively, along with addresses from corresponding ones of write transaction entries 460a–d (460a input to both 464a and 465a, and so on). Logical masks 464a–d and 465a–d carry out the masking of bits that are not desired to become part of their respective associative comparisons. Logical masks 464a–d supply their outputs to corresponding ones of comparators 467a–d, along with comparand 466, and similarly, logical masks 465a–d supply their outputs to corresponding ones of comparators 468a–d, also along with comparand 466. In some embodiments, the outputs of comparators 467a–d and 468a–d form the single comparison result vector 469, though a pair of comparison result vectors might be formed in alternate embodiments. In still other embodiments, logic between comparators 467a–d and comparators 468a–d of may be shared to avoid duplication of logic in comparing rank and bank values.

Figure 5:
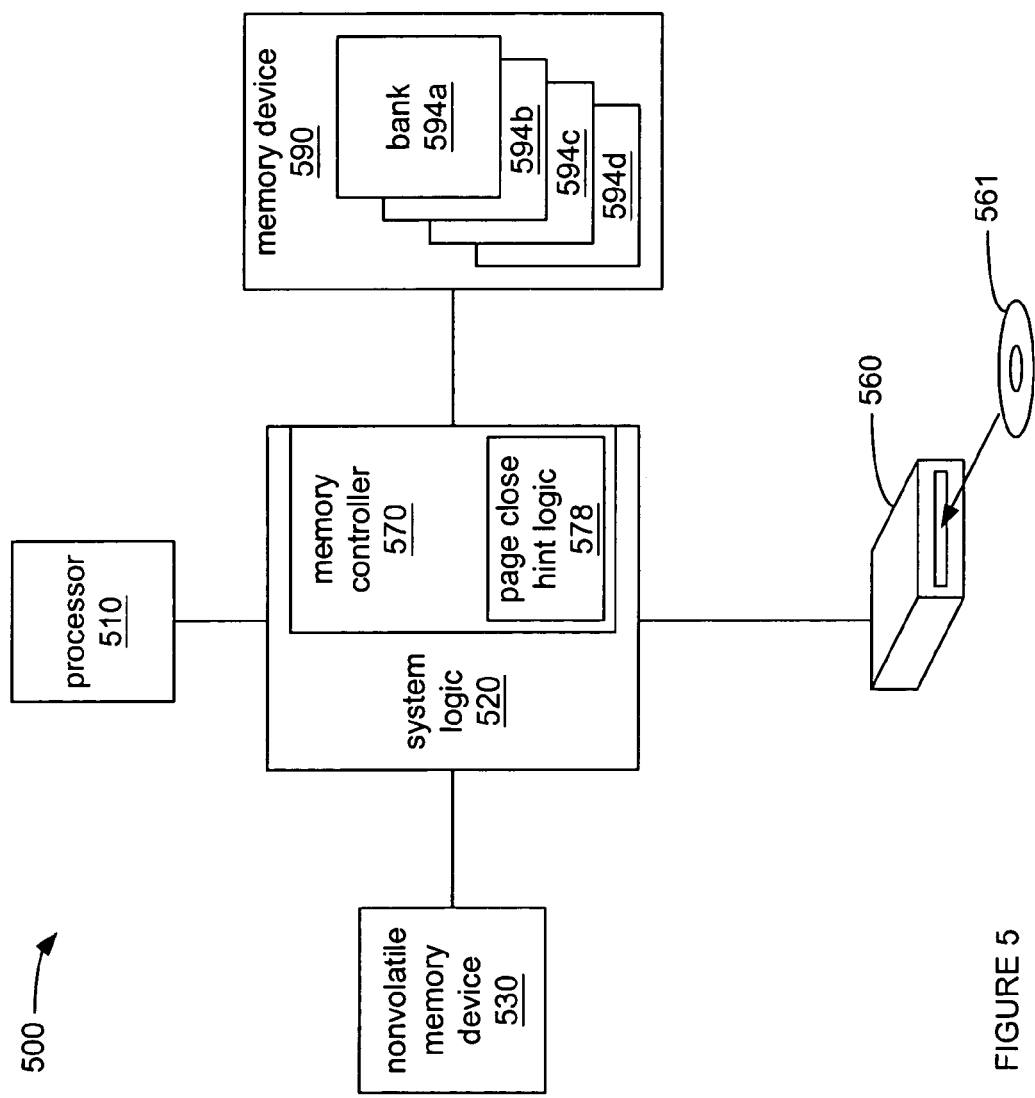
FIG. 5 is a block diagram of an embodiment employing a computer system.

FIG. 5 is a simplified block diagram of an embodiment employing a computer system. Computer system 500 is, at least in part, made up of processor 510, system logic 520, and memory device 590. System logic 520 is coupled to processor 510 and performs various functions in support of processor 510 including providing processor 510 with access to memory device 590 to which system logic 520 is also coupled, using memory controller 570 within system logic 520. Processor 510, system logic 520 and memory device 590 make up a form of core for computer system 500 that is capable of supporting the execution of machine readable instructions by processor 510 and the storage of data and instructions within memory device 590.

In various embodiments, processor 510 could be any of a variety of types of processor including a processor capable of executing at least a portion of the widely known and used "x86" instruction set, and in other various embodiments, there could be more than one processor. In various embodiments, memory device 590 could be any of a variety of types of dynamic random access memory (RAM) including fast page mode (FPM), extended data out (EDO), single data rate (SDR) or double data rate (DDR) forms of synchronous dynamic RAM (SDRAM), RAM of various technologies employing a RAMBUS™ interface, etc., and memory controller 570 provides logic 520 with an appropriate interface for the type of memory. At least a portion of the memory cells of memory device 590 are divided into banks 594a–d, each of which are made up of memory cells organized into rows and columns in a two dimensional memory array. To access a portion of the memory cells within memory device 590, that portion must be addressed by memory controller 570 with a combination of bank, row and column addresses/selects, and where appropriate, with rank selected via chip select signals or other mechanism. As those skilled in the art will recognize, the depiction of a single memory device 590 with four banks of memory cells, namely banks 594a–d, is but an example of a memory system that could be a part of a computer system, and that a larger number of memory devices and/or a differing number of ranks and/or banks within memory devices could be used without departing from the spirit and scope of the present invention as hereinafter claimed.

In some embodiments, system logic 520 is coupled to and provides processor 510 with access to storage device 560 by which data and/or instructions carried by storage media 561 may be accessed. Storage media 561 may be of any of a wide variety of types and technologies as those skilled in the art will understand, including CD or DVD ROM, magnetic or optical diskette, magneto-optical disk, tape, semiconductor memory, characters or perforations on paper or other material, etc. In some embodiments, nonvolatile memory device 530 is coupled to system logic 520 (or other part of computer system 500) and provides storage for an initial series of instructions executed at a time when computer system 500 is either "reset" or initialized (for example, when computer system 500 is "turned on" or "powered up") to perform tasks needed to prepare computer system 500 for normal use. In some variations of such embodiments, upon initialization or resetting of computer system 500, processor 510 accesses nonvolatile memory device 530 to retrieve instructions to be executed to prepare memory controller 570 for normal use in providing access for processor 510 to memory device 590. It may be that these same retrieved instructions are executed to prepare system logic 520 for normal use in providing access to storage device 560 and whatever form of storage media 561 that may be used by storage device 560.

In some embodiments, storage media 561 carries machine-accessible instructions to be executed by processor 510 to cause processor 510 to carry out one or more tests of memory device 590 and/or to interrogate a portion of nonvolatile storage within memory device 590 to determine various characteristics of memory device 590 and/or to determine what functions memory device 590 may support. Once the configuration of ranks, banks, rows and columns of memory device 590 have been determined, then processor 510 may be caused to program or otherwise configure memory controller 570 to make use of the organization of ranks, banks, rows and columns within memory device 590 to select pending write transactions and/or to employ page closing hints, as earlier described, in an effort to reduce instances in which page misses and their associated lengthy delays are encountered in write transactions to memory device 590.

Figure 6:
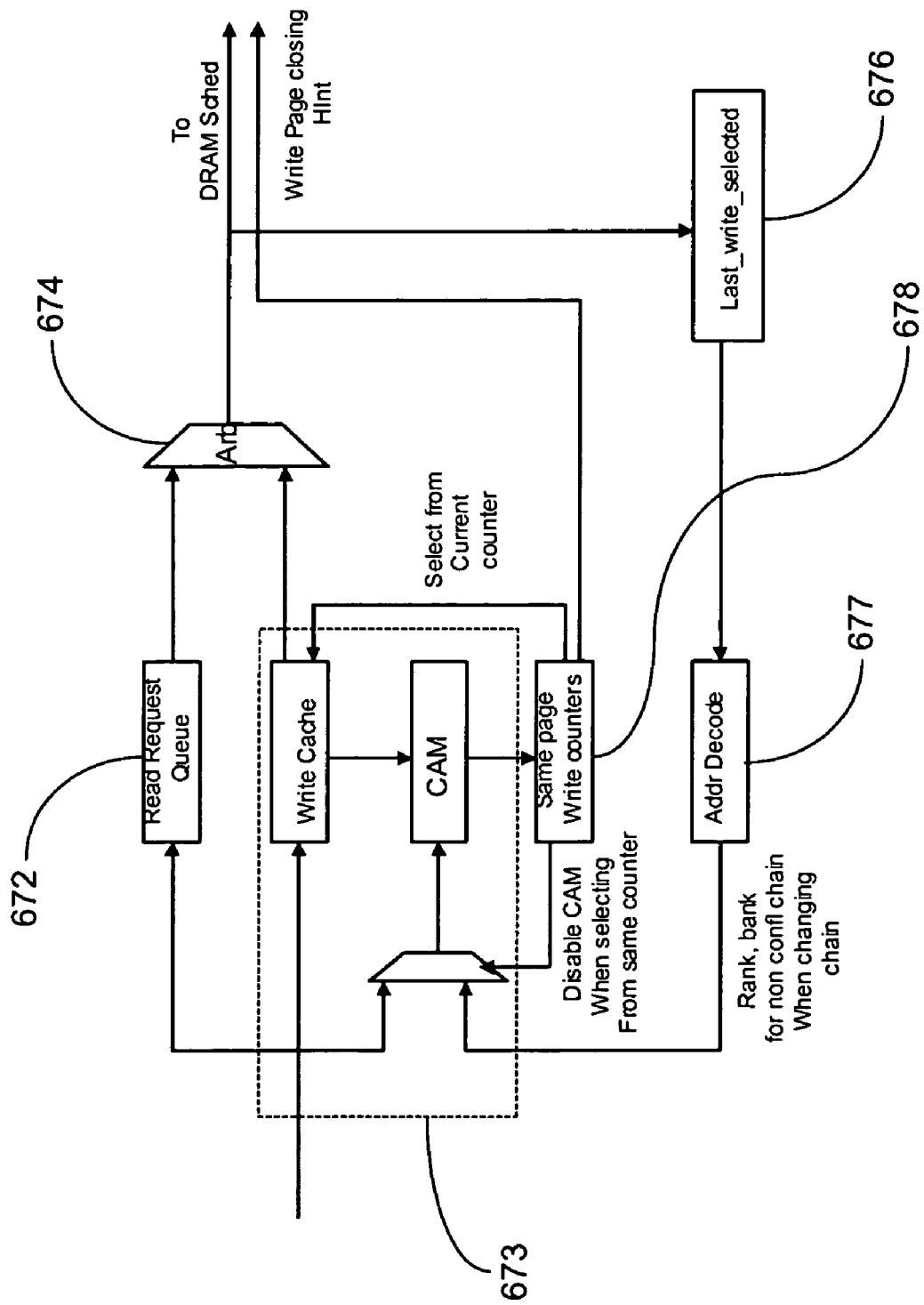
FIG. 6 is a block diagram of another embodiment employing memory control circuitry.

FIG. 6 is another embodiment employing memory control circuitry as an alternative to embodiments depicted in FIGS. 2 and 3a–d. In a manner not unlike the memory control circuitry of FIG. 2, requested read transactions are posted in read request queue 672, requested write transactions are posted in a write cache within CAM logic 673, and posted read and posted write transactions are selected through arbiter 674 in accordance with any of a number of possible algorithms for being sent to a transaction scheduler (not shown) for execution, while addresses for the last write transaction that was selected are stored within last_write_selected latch 676 (with those addresses being decoded into rank, bank, etc., as needed, depending on a given variation of an embodiment). As depicted in FIG. 6 and detailed in the following insert, each new request for a write transaction is associatively compared, using CAM logic 673, with the rank, bank and page of pending write transactions already stored in the write cache of CAM logic 673 as each such new request is received:

```
At the time of reception of a Write
    CAM new write with writes in the cache;
    If(matches rank, bank, page of existing writes) {
        Increment count for that page;
        Add a index to the write to the counter structure;
    }
    else {
        enter a new count entry in the vector;
        Add a index to the write to the counter structure;
        set count = 1;
    }
}
```

If the associative comparison reveals a match to a pending write transaction, then a counter within write counters 678 corresponding to all pending write transactions to that same rank, bank and page is incremented, and an index to this new pending write transaction now stored within the write cache of CAM logic 673 is added to the corresponding counter structure that points to all pending write transactions to that rank, bank and page. However, if the associative comparison reveals no match to any pending write transaction, then a new vector entry is made corresponding to a new counter being allocated and set to 1 to reflect the presence of this one new pending write transaction to a rank, bank and page for which a counter within write counters 678 and counter structure have not already been allocated, and an index to this new pending write transaction now stored within the write cache of CAM logic 673 is placed into a corresponding counter structure.

As also depicted in FIG. 6 and detailed in the following insert, employing CAM logic 673 to effectively organize new requests for write transactions as they are received, makes it possible, under some circumstances, to avoid having to make further use of CAM logic 673 as pending write transactions are selected to be executed by checking the count for how many write transactions to the same rank, bank and page as the last write transaction selected, the address of which is stored in last_write_selected latch 676:

```
At the time of selection of write
//Write selection and page closing algorithm:
//last_write_selected: write selected in a previous arbitration cycle
do on each arbitration cycle {
if(Counter for the same page as last_write_selected exists) }
    disable CAM; //save some power
    if(count > 1) {
                selected_entry=select next write index;
                                //could select any other write index
                                for that counter
                write_page_close_hint = 0;
                Remove selected_entry from write cache;
                dispatch selected_entry;
                last_write_selected = selected_entry;
                selected counter--;
    }
    else {
                selected_entry=select next write index;
                write_page_close_hint = 1;
                Remove selected_entry from write cache;
                dispatch selected_entry;
                last_write_selected = selected_entry;
                selected counter--;
    }
}
Else if(Counter exists that is non-conflicting with last_write_selected) {
    if(count > 1) {
                selected_entry=select next write index;
                write_page_close_hint = 0;
                Remove selected_entry from write cache;
                dispatch selected_entry;
                last_write_selected = selected_entry;
                selected counter--;
    }
    else {
                selected_entry=select next write index;
                write_page_close_hint = 1;
                Remove selected_entry from write cache;
                dispatch selected_entry;
                last_write_selected = selected_entry;
                Selected counter--;
    }
Else { //we have to select a counter that has writes conflicting with the
last_write_selected
    if(count > 1) {
                selected_entry=select next write index;
                write_page_close_hint = 0;
                Remove selected_entry from write cache;
                dispatch selected_entry;
                last_write_selected = selected_entry;
                Selected counter--;
    }
    else {
                selected_entry=select next write index;
                write_page_close_hint = 1;
                Remove selected_entry from write cache;
                dispatch selected_entry;
```

```
        last_write_selected = selected_entry;
        Selected counter--;
    }
}
```

On each occasion that arbiter 674 selects a pending write transaction to be executed, a check is made for a counter within write counters 678 that is associated with the rank, bank and page of the last pending write transaction that was selected to be executed (the address of which is stored in last_write_selected latch 676) that has a non-zero count value indicating that there is at least one more pending write transaction to that same rank, bank and page. If a counter is found and has a nonzero value greater than 1, thereby indicating that more than one such pending write transaction is available, then one of those pending write transactions is selected, a write page closing hint is provided by writer counters 678 that indicates not to close the page, the pending write transaction is removed from the write cache to be executed while its address is copied into last_write_selected latch 676, and the counter is decremented; while if a counter is found and has a nonzero value equal to 1, thereby indicating that only one such pending write transaction is available, then much the same thing happens with the exception that a write page closing hint is provided by write counters 678 that indicates that the page should be closed immediately after the one pending write transaction is executed. However, if no counter is found that is associated with the rank, bank and page of the last write transaction that was selected for execution, then an associative comparison is made employing CAM logic 673 to locate a pending write transaction that is directed to a different rank or bank than that of the last write transaction selected for execution (i.e., a "non-conflicting" write transaction), and if such a non-conflicting pending write transaction is found, then a check is made of the counter within write counters 678 that is associated with that pending write transaction to determine if the counter value is greater than 1 or equal to 1. If such a non-conflicting pending write transaction is found and the associated counter value is greater than 1, then the pending write transaction is removed from the write cache to be executed, no write page closing hint is sent by write counters 678, and the associated counter is decremented; while if the associated counter value is equal to 1 (indicating that there is only this one pending write transaction to this one set of non-conflicting rank, bank and page), much the same thing happens with the exception that a write page closing hint is provided by write counter 678. Alternatively, if there is no such non-conflicting pending write transaction, then as a last resort, a pending write transaction to the same rank and bank as the last write transaction that was selected and executed, but to a different page (i.e., a "conflicting" pending write transaction), is selected to be executed, and the counter within write counters 678 associated with this conflicting pending write transaction is checked to determine if the counter value is greater than 1 or equal to 1. If such a conflicting pending write transaction is found and the associated counter value is greater than 1, then the pending write transaction is removed from the write cache to be executed, no write page closing hint is sent by write counters 678, and the associated counter is decremented; while if the associated counter value is equal to 1, much the same thing happens with the exception that a write page closing hint is provided by write counter 678.

As further depicted in FIG. 6 and detailed in the following insert, the transaction scheduler receiving selected read and write transactions through arbiter 674 and write page closing hints from write counters 678 may selectively act on write page closing hints:

```
//Algorithm for using write page closing hint in the DRAM command
    scheduler
    if(CAS scheduled for the write transaction scheduled) {
        if(write_page_close_hint) {
            auto-precharge the page for the write scheduled;
        }
    }
```

Such a transaction scheduler may condition acting on a write page closing hint received from write counters 678 (perhaps by transmitting a write command with autoprecharge, instead of simply transmitting a write command) such that a write page closing hint will be acted upon only if the write transaction received through arbiter 674 with which the write page closing hint is associated would entail the transmission of a column address to execute.

The invention has been described in some detail with regard to various possible embodiments. It is evident that numerous alternatives, modifications, variations and uses will be apparent to those skilled in the art in light of the foregoing description. It will be understood by those skilled in the art that the present invention may be practiced in support of many possible types of memory devices employing any of a number of possible memory technologies. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. A computer system comprising:
   a processor;
   a memory device;
   a CAM coupled to the processor to store requests for write transactions received from the processor as pending write transactions;
   a first latch coupled to the CAM to store an address of a currently selected write transaction received from the CAM;
   transaction logic coupled to CAM and to the memory device to carry out the currently selected write transaction received from the CAM;
   a second latch coupled to the first latch to store a copy of the address of the currently selected write transaction received from the first latch at a subsequent time when another pending write transaction is selected, thereby causing the currently selected write transaction to be replaced and to become the previously selected write transaction;
   a multiplexer coupled to the outputs of both the first and second latches and to the CAM to select between an addresses stored in the first and second latches to become the comparand input to the CAM for a comparison; and
   control logic coupled to CAM to receive the results of the comparison and further coupled to the transaction logic to selectively accompany a write transaction selected from the CAM and sent to the transaction logic with a page closing hint signal to the transaction logic.

2. The computer system of claim 1, further comprising:
a read transaction buffer to store pending read transactions; and
arbiter logic coupled to the output of the read transaction buffer and the CAM to make a determination whether a read transaction or a write transaction is to be the next transaction to be carried out, and further coupled to the transaction logic to supply the transaction logic with the result of the determination.

3. The computer system of claim 1, further comprising mask logic coupled to the multiplexer to screen out bits correlating to a column of memory cells within a page such that the comparison does not include the specification of a column, and to selectively and additionally screen out bits correlating to a page such that the comparison selectively does not include the specification of a page.

4. The computer system of claim 3, wherein the address of a pending write transaction stored within the write transaction buffer is stored in the form of a single binary value specifying the starting address of a portion of the memory device to which the write transaction is directed, and further comprising conversion logic to convert the single binary value to a plurality of values that separately specify at least a bank and a page, wherein the associative comparison receives the plurality of values as an input.

5. The computer system of claim 1, further comprising a nonvolatile portion of memory within the memory device indicating the configuration of ranks, banks, pages and columns into which memory cells within the memory device are organized.

6. The computer system of claim 5, wherein the nonvolatile portion of memory within the memory device is accessible by the processor, and wherein the mask logic is programmable by the processor to permit the processor to program the mask logic with mask values based on the configuration of ranks, banks, pages and columns indicated by the nonvolatile portion of the memory within the memory device.

7. The computer system of claim 1, wherein the transaction logic transmits a write command to the memory device along with an auto precharge command if a write transaction selected from the CAM and sent to the transaction logic is accompanied with a page closing hint signal.

8. A memory controller comprising:
a transaction buffer to store pending write transactions;
a first latch coupled to the output of the transaction buffer to store an address of a currently selected write transaction received from the transaction buffer;
transaction logic coupled to the output of the transaction buffer to carry out the currently selected write transaction received from the transaction buffer;
a second latch coupled to the first latch to store a copy of the address of the currently selected write transaction received from the first latch at a time when another pending write transaction selected subsequently, thereby causing the currently selected write transaction to be replaced and to become the previously selected write transaction;
a multiplexer coupled to the outputs of both the first and second latches to select between an address stored in the first latch and an address stored in the second latch to become a comparand;
comparison logic coupled to the output of the multiplexer and to the transaction buffer to carry out an associative comparison between the comparand received from the multiplexer and addresses of the pending write transactions stored in the transaction buffer; and
control logic coupled to the output of the comparison logic to receive the results of the associative comparison and further coupled to the transaction logic to selectively accompany a write transaction selected from the transaction buffer and sent to the transaction logic with a page closing hint signal to the transaction logic.

9. The memory controller of claim 8, further comprising:
a separate read transaction buffer to store pending read transactions; and
arbiter logic coupled to the outputs of both the separate read transaction buffer and the transaction buffer to make a determination whether a read transaction or a write transaction is to be the next transaction to be carried out, and further coupled to the transaction logic to supply the transaction logic with the result of the determination.

10. The memory controller of claim 8, wherein the transaction buffer also stores read transactions, and further comprising arbiter logic coupled to the output of the transaction buffer to make a determination whether a read transaction or a write transaction is to be the next transaction to be carried out, and further coupled to the transaction logic to supply the transaction logic with the result of the determination.

11. The memory controller of claim 8, further comprising mask logic coupled to the multiplexer to screen out bits correlating to a column of memory cells within a page such that the associative comparison does not include the specification of a column, and to selectively and additionally screen out bits correlating to a page such that the associative comparison selectively does not include the specification of a page.

12. The memory controller of claim 11, wherein the address of a pending write transaction stored within the write transaction buffer is stored in the form of a single binary value specifying the starting address of a portion of memory coupled to the memory controller and to which the write transaction is directed, and further comprising conversion logic to convert the single binary value to a plurality of values that separately specify at least a bank and a page, wherein the associative comparison receives the plurality of values as an input.

13. The computer system of claim 8, wherein the transaction logic transmits a write command to the memory device along with an auto precharge command if a write transaction selected from the write transaction buffer and sent to the transaction logic is accompanied with a page closing hint signal.

14. A method comprising:
making available a first storage location for storing the address to which a new selected_entry write transaction will be directed while continuing to store the address to which a recent selected_entry write transaction was directed, thereby causing the recent selected_entry write transaction to become the last_write_selected write transaction;
associatively comparing at least the bank and page of the last_write_selected write transaction to at least the bank and page of pending write transactions stored in a transaction buffer;
selecting a pending write transaction from within the transaction buffer to become the new selected_entry write transaction, removing the selected_entry write transaction from the transaction buffer, and provide the selected_entry write transaction with a page closing hint to transaction logic to carry out the selected_entry write transaction if the selected_entry write transaction was the only write transaction in the transaction buffer with at least the same bank and page as the last_write_selected write transaction; and selecting a pending write transaction from within the transaction buffer to become the new selected_entry write transaction, removing the selected_entry write transaction from the transaction buffer, and provide the selected_entry write transaction without a page closing hint to transaction logic to carry out the selected_entry write transaction if the selected_entry write transaction was one of multiple pending write transactions in the transaction buffer with at least the same bank and page as the last_write_selected write transaction.

15. The method of claim 14, further comprising:

selecting a pending write transaction from within the transaction buffer to become the new selected_entry write transaction, removing the selected_entry write transaction from the transaction buffer, associatively comparing at least the bank and page of the selected_entry write transaction to at least the bank and page of the remaining pending write transactions stored in the transaction buffer, providing the selected_entry write transaction with a page closing hint to transaction logic to carry out the selected_entry write transaction if there were no pending write transactions found in the transaction buffer directed to at least the same bank and page as the last_write_selected transaction, the selected_entry write transaction was directed to a different bank than the last_write_selected write transaction, and no other pending write transaction in the transaction buffer is directed to the same bank and page as the selected_entry write transaction; and selecting a pending write transaction from within the transaction buffer to become the new selected_entry write transaction, removing the selected_entry write transaction from the transaction buffer, associatively comparing at least the bank and page of the selected_entry write transaction to at least the bank and page of the remaining pending write transactions stored in the transaction buffer, providing the selected_entry write transaction without a page closing hint to transaction logic to carry out the selected_entry write transaction if there were no pending write transactions found in the transaction buffer directed to at least the same bank and page as the last_write_selected transaction, the selected_entry write transaction was directed to a different bank than the last_write_selected write transaction, and there is at least one other pending write transaction in the transaction buffer directed to the same bank and page as the selected_entry write transaction.

16. The method of claim 14, further comprising:

selecting a pending write transaction from within the transaction buffer to become the new selected_entry write transaction, removing the selected_entry write transaction from the transaction buffer, associatively comparing at least the bank and page of the selected_entry write transaction to at least the bank and page of the remaining pending write transactions stored in the transaction buffer, providing the selected_entry write transaction with a page closing hint to transaction logic to carry out the selected_entry write transaction if there were no pending write transactions found in the transaction buffer directed to at least the same bank and page as the last_write_selected transaction, there were no pending write transactions found in the transaction buffer directed to a different bank than the last_write_selected transaction, the selected_entry write transaction was directed to the same bank as the last_write_selected write transaction, but to a different page than the last_write_selected write transaction, and no other pending write transaction in the transaction buffer is directed to the same bank and page as the selected_entry write transaction; and selecting a pending write transaction from within the transaction buffer to become the new selected_entry write transaction, removing the selected_entry write transaction from the transaction buffer, associatively comparing at least the bank and page of the selected_entry write transaction to at least the bank and page of the remaining pending write transactions stored in the transaction buffer, providing the selected_entry write transaction without a page closing hint to transaction logic to carry out the selected_entry write transaction if there were no pending write transactions found in the transaction buffer directed to at least the same bank and page as the last_write_selected transaction, there were no pending write transactions found in the transaction buffer directed to a different bank than the last_write_selected transaction, the selected_entry write transaction was directed to the same bank as the last_write_selected write transaction, but to a different page than the last_write_selected write transaction, and there is at least one other pending write transaction in the transaction buffer is directed to the same bank and page as the selected_entry write transaction.

* * * * *